United States Patent Office 3,849,375
Patented Nov. 19, 1974

3,849,375
LATENT CURING EPOXY RESIN-AROMATIC
DISULFONAMIDE COMPOSITIONS
Harry A. Smith, Midland, Mich., assignor to The Dow
Chemical Company, Midland, Mich.
No Drawing. Filed Apr. 2, 1973, Ser. No. 347,170
Int. Cl. C08g 30/14
U.S. Cl. 260—47 EN                                   7 Claims

ABSTRACT OF THE DISCLOSURE

Latent curing epoxy resin compositions are described which comprise: (1) an epoxy resin such as the diglycidyl ether of bisphenol A, (2) a disulfonamide such as diphenyl oxide disulfonamide wherein the quantity of component (2) is employed so as to provide at least 0.9 amine hydrogen equivalent per epoxide equivalent.

---

This invention relates to latent curing epoxy resin compositions comprising an epoxy resin and an aromatic disulfonamide.

Commonly employed latent curing agents for epoxy resins include accelerated dicyandiamide. Such latent curing agents produce coatings which are hazy or grainy.

It has now been unexpectedly discovered that coatings prepared from epoxy resins employing an aromatic polysulfonamide as the latent curing agent have a better asthetic appearance in that such coatings are not hazy and/or grainy but are glossy and smooth.

The latent curing epoxy resin compositions of the present invention comprise:

(1) an epoxy resin having an average of more than one 1,2-epoxy group per molecule and
(2) an aromatic disulfonamide having an average of more than one sulfonamide group per molecule; wherein components (1) and (2) are employed in quantities such that the sulfonamide hydrogen equivalent:epoxide equivalent is at least 0.9:1 and preferably from about 0.9:1 to about 1.25:1.

Suitable epoxy resins having an average of more than one 1,2-epoxy group per molecule include, for example, those epoxy resins represented by the following general formulae:

A.
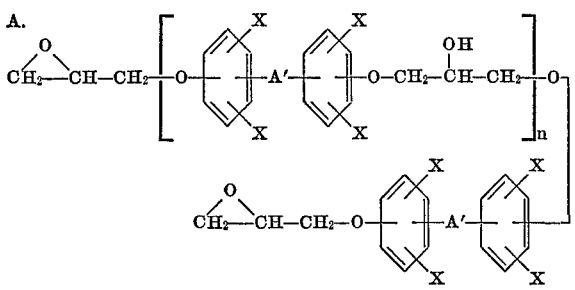

Wherein each A' is independently selected from the group consisting of a divalent hydrocarbon group having from 1 to 4 carbon atoms,

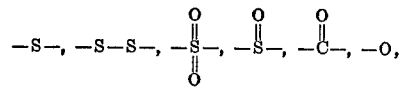

X is a hydrogen or a halogen and $n$ is an integer having an average value of from about 0 to about 10;

B.
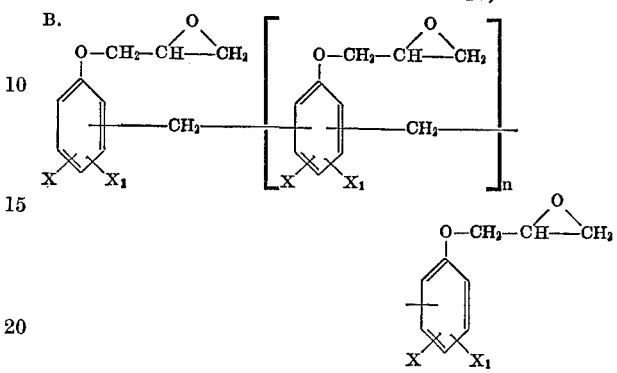

wherein X and $X_1$ are independently selected from the group consisting of hydrogen, an alkyl group having from about 1 to 4 carbon atoms, and a halogen and $n$ is an integer having an average value of from about 0.1 to about 4;

C.
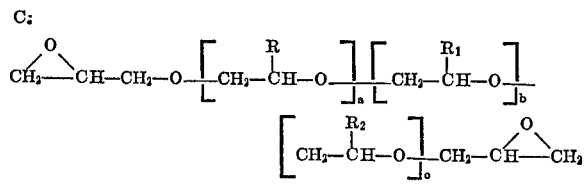

where R, $R_1$ and $R_2$ are independently hydrogen, an alkyl or haloalkyl group having from about 1 to about 4 carbon atoms, and $a$, $b$, and $c$ are integers, the sum of which is an integer having an average value of from about 3 to about 40;

D.
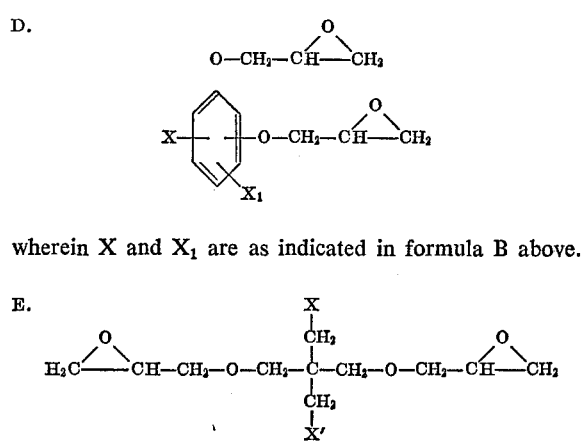

wherein X and $X_1$ are as indicated in formula B above.

E.
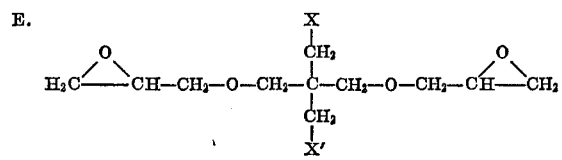

wherein X and X' are independently selected from hydrogen, chlorine and bromine.

F.

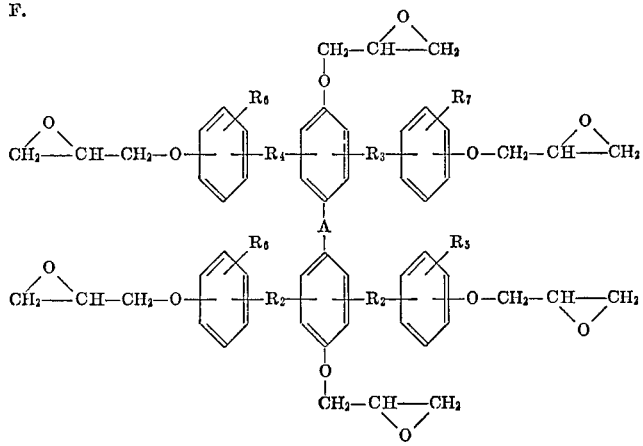

wherein A is a divalent radical selected from the group consisting of alkylidene, cycloalkylidene,

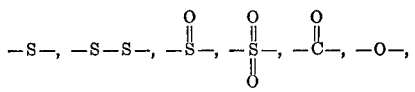

$R_1$, $R_2$, $R_3$ and $R_4$ are independently alkylidene groups and $R_5$, $R_6$, $R_7$ and $R_8$ are independently hydrogen, halogen or alkyl groups having from 1 to about 4 carbon atoms.

Suitable disulfonamides which are employed in the novel latent curing epoxy resin compositions of the present invention include those represented by the general formulae:

I

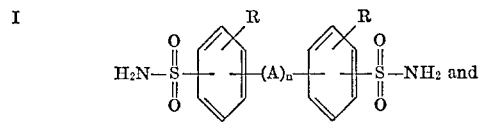

II,

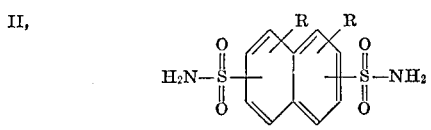

III,

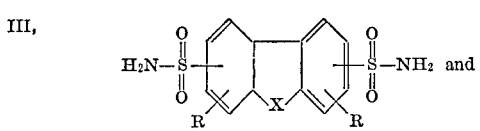

IV,

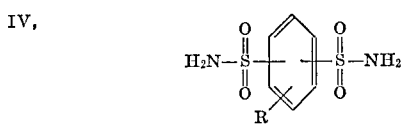

wherein A is a divalent hydrocarbon group having from 1 to about 6 carbon atoms,

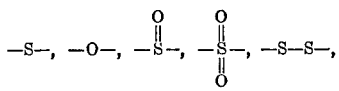

or a single bond, each R is independently hydrogen, an aliphatic hydrocarbon group having from 1 to about 6 carbon atoms, Cl, Br, —O—R' wherein R' is an alkyl group having from 1 to about 6 carbon atoms, $n$ has a value of 0 or 1 and X is O or S.

Disulfonamides such as represented by the above formulae I-IV include, for example, diphenylether-4,4'-disulfonamide,
di(bromophenyl)ether-4,4'-disulfonamide,
di(methylphenyl)ether-4,4'-disulfonamide,
di(butylphenyl)ether-4,4'-disulfonamide,
di(propylphenyl)ether-4,4'-disulfonamide,
di(chlorophenyl)ether-4,4'-disulfonamide,
naphthalene-1,5-disulfonamide,
methyl-naphthalene-1,5-disulfonamide,
ethyl-naphthalene-1,5-disulfonamide,
dipropylnaphthalene-1,5-disulfonamide,
chloronaphthalene-1,5-disulfonamide,
bromonaphthalene-1,5-disulfonamide,
dibromonaphthalene-1,5-disulfonamide,
meta- and para-phenylene disulfonamide,
dibenzofuran disulfonamide,
dibenzothiophene disulfonamide,
mixtures thereof and the like.

The disulfonamide starting materials are conveniently prepared by chlorosulfonating the desired aromatic compound with at least a stoichiometric quantity of a suitable chlorosulfonation agent such as, for example, chlorosulfonic acid at a temperature of from about 50° C. to reflux for from about 2 to about 6 hours or longer. The resultant disulfonyl chloride after removal of any excess chlorosulfonation agent is then reacted with aqueous or anhydrous ammonia at 40–150° C. under the autogenous pressure of the ammonia for about 2 to about 24 hours. The resultant disulfonamide is then precipitated in cold water, filtered, and the product is finally recovered by slurrying the precipitate in hot water and again filtering.

The compositions of the present invention may also contain one or more of such additives such as, for example, flow control agents, accelerators, pigments, solvents, dispersing agents, fire retardant compounds, and the like.

Although the diphenyloxide disulfonamides are effective latent catalysts for epoxy resins, they require long curing periods at elevated temperatures for effecting the cure of the epoxy resins. However, the cure can be achieved more rapidly with the addition of accelerators.

Suitable accelerators include phosphonium compounds, such as, for example, ethyltriphenylphosphonium acetate·acetic acid complex; imidazoles, such as, for example, 2-methyl imidazole; amonium salts, such as, for example, benzyltrimethyl ammonium chloride; alkali metal hydroxides, such as, for example, sodium hydroxide; mixtures thereof and the like.

Suitable phosphonium compounds which may be employed as accelerators include those phosphonium salts of an inorganic acid and salts of organic acids, esters and acid-esters. Such phosphonium compounds are more fully described in application Ser. No. 41,618 filed May 28, 1970; application Ser. No. 181,191 filed Sept. 16, 1971; U.S. Pats. 3,477,990 and U.S. 3,341,580. So much of these applications and patents as pertains to a description of phosphonium compounds and methods for their preparation are incorporated herein by reference.

The accelerators are usually employed in quantities of from about 0.1 to about 5.0 and preferably from about 0.5 to about 1.0 parts by weight based upon total resin solids, i.e. epoxy + curing agent.

The compositions of the present invention are useful in such applications as coatings, adhesives, castings, laminates and the like.

The compositions of the present invention exhibit a greater degree of latency, i.e. room temperature stability in powder coating systems or any system wherein the epoxy resin employed is a solid. Such compositions are room stable for periods of 6 months or greater. The compositions of the prior art which contain liquid epoxy resins and dicyandiamide are only latent for periods of about a week and in some instances possibly up to about a month before the composition gels. This gelling is not a cross-linking curing reaction between the dicyandiamide and the epoxy resin, but a catalytic action of some type causing an epoxy to epoxy reaction.

TABLE I

|  | Room temp. | 150° C. | 200° C. |
|---|---|---|---|
| T-gel time | 10 months | 30 min. | 140 min. |

EXAMPLE 2

Solution coatings were prepared from an epoxy resin employing diphenyl oxide disulfonamide as the latent curing agent and also containing 2-methyl imidazole or a phosphonium compound as an accelerator. For comparative purposes, a coating was prepared employing dicyandiamide accelerated with 2-methyl imidazole and p-toluene sulfonamide accelerated with 2-methyl imidazole. The compositions of the coatings and the properties are given in Table II. The coating compositions were applied to cold rolled steel panels at a coating thickness of about 1 mil and cured as indicated in Table II.

The Hot Tack Test is an indication of curing. A wooden tongue depressor was drawn across the hot coating surface and if the coating was marked, a lack of cure was indicated. If it was not marked, then the coating was deemed to have cured. In the Table, a "yes" indicates that the coating was marked by the tongue depressor while a "no" indicates that the coating was not marked.

TABLE II

| | Present invention | | Comparative | | Present invention | |
|---|---|---|---|---|---|---|
| | Coating A | Coating B | Coating C | Coating D | Coating E | Coating F |
| Composition and property: | | | | | | |
| Epoxy resin, g.[1] | 9.5 | 9.5 | 9.5 | 9.5 | 9.5 | 9.5. |
| Dicyandiamide, g | 0 | 0 | .375 | 0 | 0 | 0. |
| 2-methyl imidazole, g | 0 | 0 | .125 | 0.05 | 0.05 | 0. |
| Diphenyloxide disulfonamide, g | 1.0 | 1.0 | 0 | 0 | 1.10 | 1.10. |
| p-Toluenesulfonamide | 0 | 0 | 0 | 1.16 | 0 | 0. |
| Phosphonium compound, g.[2] | 0.05 | 0.1 | 0 | 0 | 0 | 0. |
| Diacetone alcohol, g | 23 | 23 | 23 | 23 | 23 | 23. |
| Cured at 350° F. (175° C.) for the indicated time: | | | | | | |
| 5-minute cure: | | | | | | |
| Film appearance | Very good | Very good | Hazy and grainy. | Very good | Very good | Very good. |
| Hot tack | Yes | No | Yes | Yes | No | Yes. |
| 160 in.-lbs. reverse impact | Fails | Pass | Fails | Fails | Pass | Fails. |
| Acetone spot test | do | Softens | do | do | Softens slightly | Do. |
| 10-minute cure: | | | | | | |
| Film appearance | Very good | Very good | Grainy | Very good | Very good | Very good. |
| Hot tack | Very slight | No | No | Yes | No | Yes. |
| 160 in.-lbs. reverse impact | Pass | Pass | Pass | Pass | Pass | Fails. |
| Acetone spot test | Softens | Softens | Softens | Fails | Softens slightly | Do. |
| 15-minute cure: | | | | | | |
| Film appearance | Very good | Very good | Grainy | Very good | Very good | Very good. |
| Hot tack | No | No | No | Yes | No | Yes. |
| 160 in.-lbs. reverse impact | Pass | Pass | Pass | Pass | Pass | Fails. |
| Acetone spot test | Softens | Softens | Softens | Fails | Softens slightly | Do. |
| 30-minute cure (overcure): | | | | | | |
| Film appearance | Very good | Very good | Grainy | Very good | Very good | Very good. |
| Hot tack | No | No | No | Yes | No | Yes. |
| 160 in.-lbs. reverse impact | Pass | Pass | Pass | Pass | Pass | Fails. |
| Acetone spot test | Softens | Softens | Softens | Fails—Softens slightly. | Softens slightly | Do. |

[1] The epoxy resin was a diglycidyl ether of bisphenol A having an EEW of about 700–875.
[2] The phosphonium compound was ethyltriphenyl phosphonium acetate·acetic acid complex.

The following examples are illustrative of the present invention but are not to be construed as to limiting the scope thereof in any manner.

EXAMPLE 1

The T-gel times by ASTM D–2471–68 were obtained on the following composition at room temperature, 150° C. and 200° C.

9.5 grams (0.05 equiv.) of a diglycidyl ether of bisphenol A having an average EEW of about 189.
4.1 grams (0.05 equiv.) of diphenyloxide disulfonamide having an AHEW* of about 82.

The results are given in the following Table I.

*AHEW = Sulfonamide hydrogen equivalent weight.

I claim:
1. A latent curing epoxy resin composition comprising:
(1) an epoxy resin having an average of more than one 1,2-epoxy group per molecule and
(2) an aromatic disulfonamide;
wherein components (1) and (2) are present in quantities so as to provide a sulfonamide hydrogen equivalent: epoxy equivalent ratio of at least about 0.9:1.
2. The composition of claim 1 wherein the sulfonamide hydrogen equivalent:epoxide equivalent ratio is from about 0.9:1 to about 1.25:1.
3. The composition of claim 2 wherein the disulfonamide is diphenyl oxide disulfonamide.
4. The composition of claim 2 wherein the epoxy resin is a glycidyl ether of bisphenol A.
5. The composition of claim 3 wherein the epoxy resin is a glycidyl ether of bisphenol A.

6. The composition of claim 1 wherein the composition contains 0.1 to 5.0 parts by weight based on the total amount of epoxy resin and aromatic disulfonamide of an accelerator selected from phosphonium salts, imidazoles, ammonium salts, alkali metal hydroxides, and mixtures thereof.

7. The composition of claim 6 wherein the accelerator is a phosphonium salt of an inorganic acid or a phosphonium salt of an organic acid, an organic ester or an organic acid ester.

References Cited
UNITED STATES PATENTS

| | | | |
|---|---|---|---|
| 2,712,001 | 6/1955 | Greenlee | 260—47 EM |
| 3,475,353 | 10/1969 | Farber | 260—2 EP |

HAROLD D. ANDERSON, Primary Examiner

T. E. PERTILLA, Assistant Examiner

U.S. Cl. X.R.

117—132 BE; 260—2N, 47 EC, 49, 59